United States Patent
Gervais et al.

(10) Patent No.: US 8,341,434 B2
(45) Date of Patent: Dec. 25, 2012

(54) OPTIMIZING VOLTAGE ON A POWER PLANE USING A NETWORKED VOLTAGE REGULATION MODULE ARRAY

(75) Inventors: Gilles Gervais, Austin, TX (US); Alain Loiseau, Williston, VT (US); Kirk D. Peterson, Jericho, VT (US); Norman J. Rohrer, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 12/037,743

(22) Filed: Feb. 26, 2008

(65) Prior Publication Data
US 2009/0217059 A1     Aug. 27, 2009

(51) Int. Cl.
*G06F 1/00*     (2006.01)
(52) U.S. Cl. ...................................................... 713/300
(58) Field of Classification Search ................... 713/300
See application file for complete search history.

(56) References Cited

U.S. PATENT DOCUMENTS

| | | | |
|---|---|---|---|
| 5,914,873 A | 6/1999 | Blish, II | |
| 6,480,989 B2 | 11/2002 | Chan et al. | |
| 6,600,220 B2 | 7/2003 | Barber et al. | |
| 6,735,704 B1 * | 5/2004 | Butka et al. | 713/300 |
| 7,000,125 B2 * | 2/2006 | Chapuis et al. | 713/300 |
| 7,049,798 B2 * | 5/2006 | Chapuis et al. | 323/282 |
| 7,061,104 B2 | 6/2006 | Kenny et al. | |
| 7,262,583 B2 | 8/2007 | Pohlman et al. | |
| 7,506,179 B2 * | 3/2009 | Templeton | 713/300 |
| 2004/0046535 A1 * | 3/2004 | Duffy et al. | 323/283 |
| 2007/0007642 A1 | 1/2007 | Tajika | |
| 2008/0172565 A1 * | 7/2008 | Chu et al. | 713/300 |

* cited by examiner

*Primary Examiner* — Mohammed Rehman
(74) *Attorney, Agent, or Firm* — Yudell Isidore Ng Russell PLLC

(57) ABSTRACT

A method, system, and computer program for using an array of networked 3D voltage regulation modules (VRMs) to optimize power usage by components on a voltage island in real time is presented. The networked VRM devices work in parallel to supply adequate power to connected voltage islands, and to supplement other VRMs in the system that may require additional power in the case of a critical event.

12 Claims, 4 Drawing Sheets

OPTIMIZING VOLTAGE ON A POWER PLANE USING A NETWORKED VOLTAGE REGULATION MODULE ARRAY

BACKGROUND OF THE INVENTION

The present invention relates in general to computers, and in particular to computer hardware. Still more particularly, the present invention relates to a system, method, and computer program for optimizing power and performance of a device through the use of networked three-dimensional (3D) Voltage Regulation Modules.

SUMMARY OF THE INVENTION

A method, system, and computer program for using an array of networked 3D voltage regulation modules (VRMs) to optimize power usage by components on a voltage island in real time is presented. The networked VRM devices work in parallel to supply adequate power to connected voltage islands, and to supplement other VRMs in the system that may require additional power in the case of a critical event.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
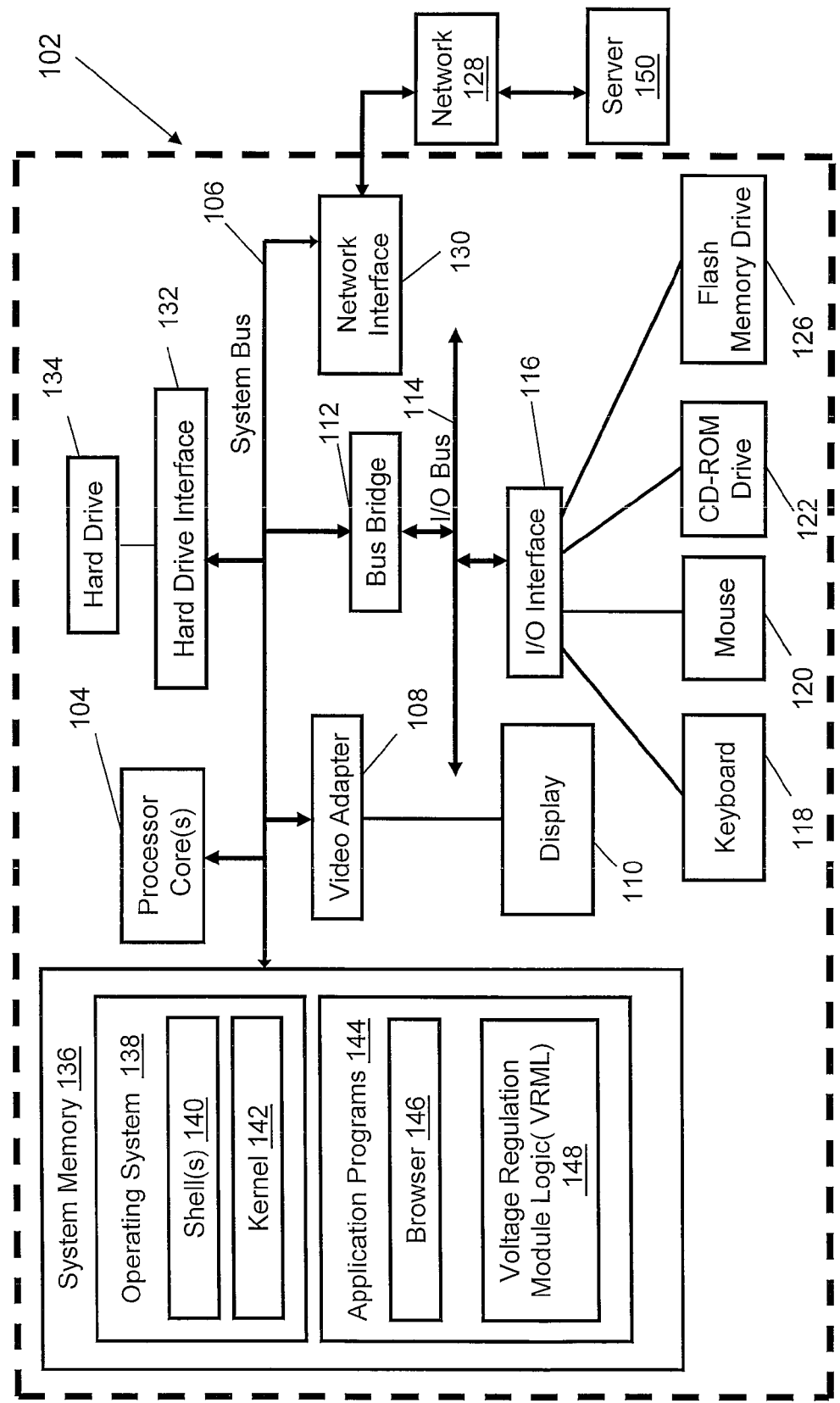
FIG. 1 is a block diagram of a data processing system in which the present invention may be implemented.

With reference now to FIG. 1, there is depicted a block diagram of an exemplary computer 100 in which the present invention may be implemented. Computer 102 includes one or more processor cores 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150.

Application programs 144 in computer 102's system memory (as well as software deploying server 150's system memory) also include a Voltage Regulation Module Logic (VRML) 148. VRML 148 includes code for implementing the processes described in FIGS. 2-4.

The hardware elements depicted in computer 102 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of VRML 148), thus freeing computer 102 from having to use its own internal computing resources to execute VRML 148.

Figure 3:
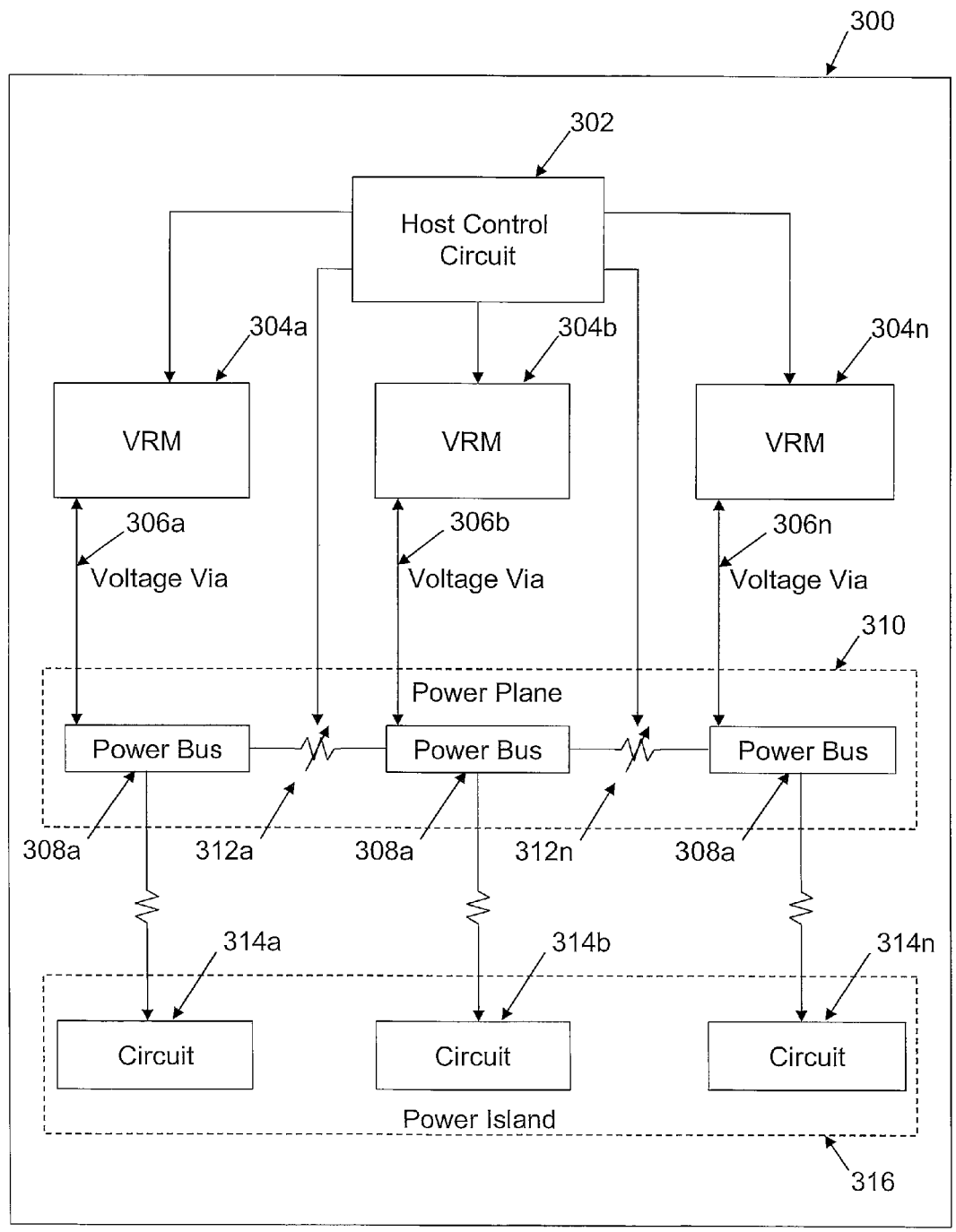
FIG. 3 depicts exemplary components of the overall system incorporating a host controller for direct VRM control.

Note also server 150 and Host Control Circuit 302, shown in FIG. 3 may utilize a substantially similar architecture as that shown for computer 102.

Figure 2:
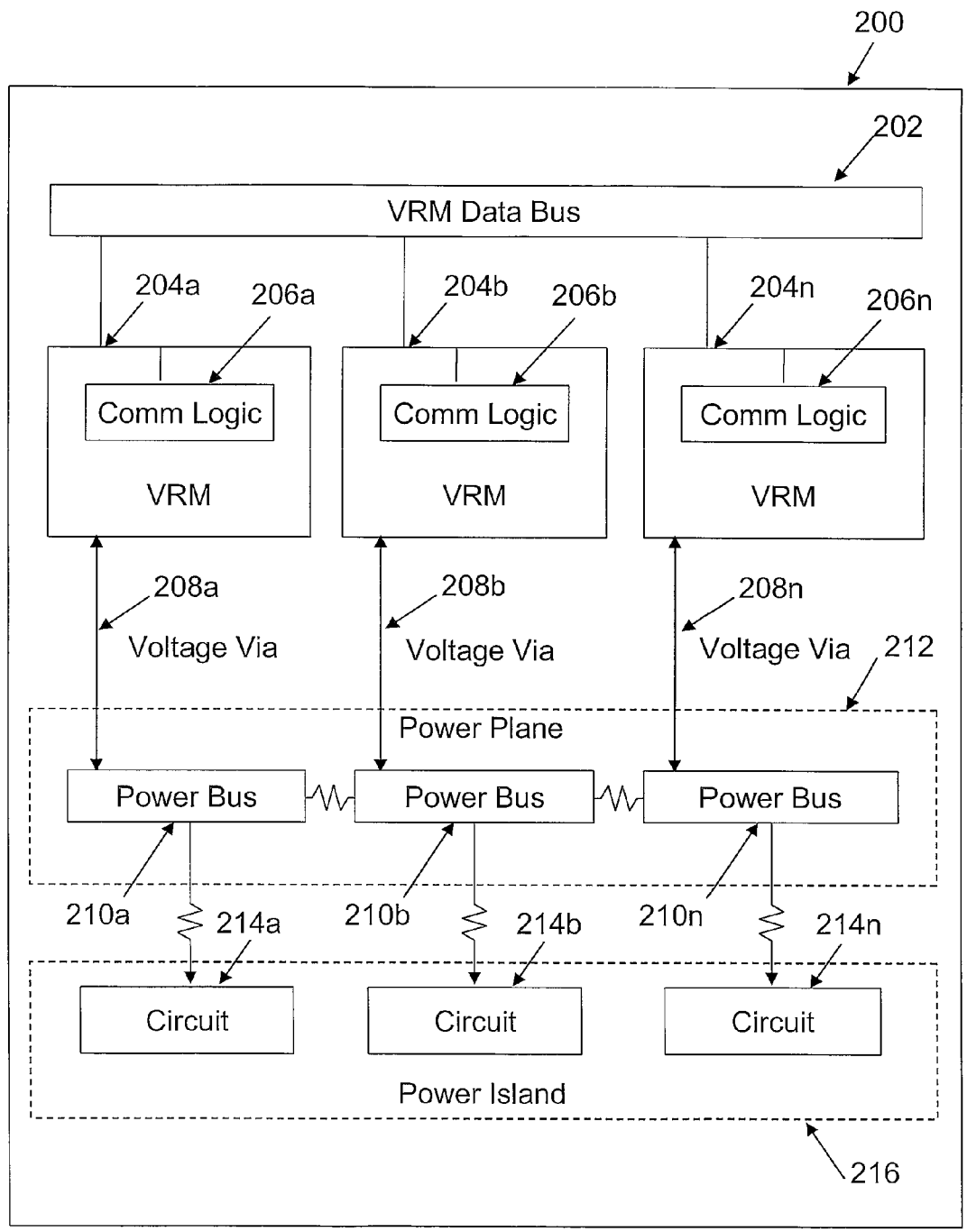
FIG. 2 depicts exemplary components of the overall system incorporating a common 3D VRM data bus for VRM intercommunication.

With reference now to FIG. 2, a high level illustration detailing exemplary components of the overall system incorporating a common 3D VRM data bus for VRM inter-communication. A computer chip 200 on which 3D VRMs are attached is presented. While VRMs 204*a-n* are shown for exemplary purposes in a two dimensional alignment in FIG. 2, VRMs 204*a-n* are arranged in a 3D alignment above the computer chip 200. VRMs 204*a-n* communicate directly with other VRMs 204*a-n* on a VRM Data Bus 202 using Communication Logics 206*a-n*, which are components of VRMs 204*a-n*. Communication Logics 206*a-n* are internal to the VRMs 204*a-n* and govern the communication of power consumption and operation data to other VRMs Bus' 210*a-n*, of the Power Plane 212, which is in turn coupled to Circuits 214*a-n*, of Power Island 216. Concurrently, the VRMs 204*a-n* measure the current power consumption of respective Circuits 214*a-n* coupled to a specific Power Bus 210*a-n*, for which a specific VRM 204*a-n* is connected.

Assuming for explanatory purposes, that the power consumption level of Circuit 214*a* exceeded a critical level, VRM 204*a* then sends notice, using Communication Logic 206*a*, to all networked VRMs 204*b-n* in Computer Chip 200 to supply surplus voltage through Voltage Vias 208*b-n* to the Power Plane 212. VRMs 204*a* can then utilize surplus voltage from the Power Plane 212 as supplementary voltage to aid in the powering of critical Circuit 214*a*, until the critical voltage event has subsided.

Note also each VRM 204*a-n* of the array may be independently preset to output specific voltage levels to guarantee adequate functionality of the Circuit 214*a-n* while and minimizing excess power. The preset voltage levels are determined through characterization and testing of the circuits.

With reference now to FIG. 3, a high level illustration detailing exemplary components of the overall system, incorporating a common Host Control Circuit 302 for 3D VRM control. A computer chip 300 on which 3D VRMs are attached is presented. While VRMs 304*a-n* are shown for exemplary purposes in a two dimensional alignment in FIG. 3, VRMs 304*a-n* are arranged in a 3D alignment above the computer chip 300. The Host Control Unit 302 measure the current power consumption of respective Circuits 306*a-n* for which a specific VRM 304*a-n* is connected. The VRMs 304*a-n* supply a fixed voltage through Voltage Vias 306*a-n* to a specific Power Bus' 308*a-n*, of the Power Plane 310. The Power Bus' 308*a-n* of Power Plane 310, are connected using a Voltage Gate 312*a-n* which can open or close to permit the transfer of voltage across Power Buses 312*a-n* of Power Plane 310. Power Buses 308*a-n* are coupled directly to Circuits 314*a-n*, of Power Island 316 for which a specific Power Bus 308*a-n* is connected.

Assuming for explanatory purposes, that the power consumption level of Circuit 314*a*, exceeded a critical level, Host Control Circuit 302, instructs necessary Voltage Gates 312*a-n* in Computer Chip 300 to open as necessary to supply surplus voltage from Power Buses 308*b-n* of Power Plane 312 to Circuit 314*a*. Circuit 314*a* can then utilize the surplus voltage as supplementary voltage to aid in the powering of critical Circuit 314*a*, until the critical voltage event has subsided.

Figure 4:
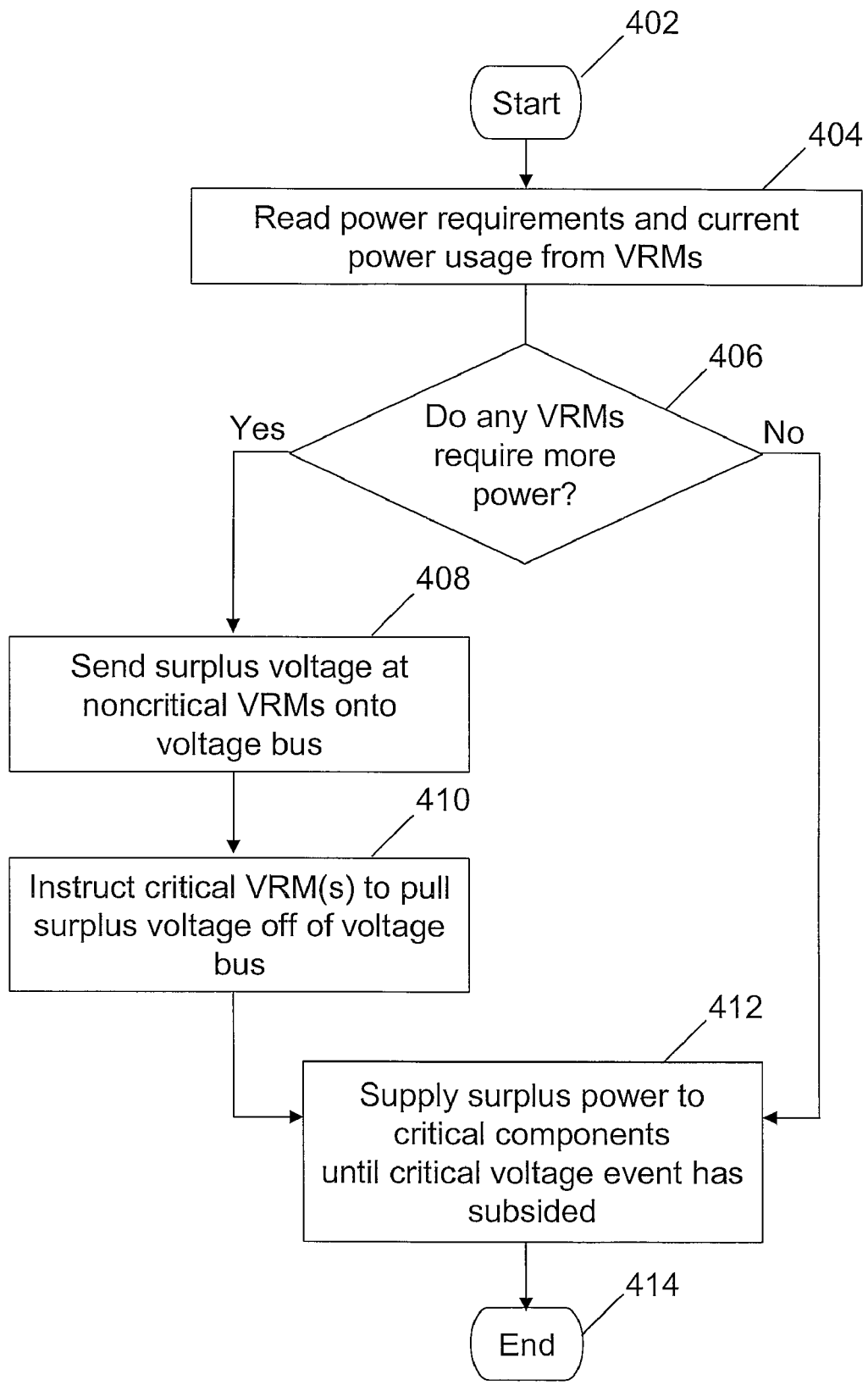
FIG. 4 is a high-level logical flowchart of an exemplary set of steps performed to determine if any VRMs in the system require supplemental power due to a critical event.

With reference now to FIG. 4, a high-level logical flowchart of an exemplary set of steps performed to determine if any VRMs in the system require supplemental power due to a critical event. After initiator block 402, the power requirements and current power usage, of associated components, are measured for each VRM in an array of VRMs (block 404). Logic in the VRM array then determines if any of the VRMs require additional power to maintain proper operation of connected components (block 406). When additional power is required at a critical VRM, the VRM's logic instructs all noncritical VRMs with surplus power to add surplus voltage to the voltage bus (block 408). The VRM's logic then instructs the critical VRM(s) to utilize surplus voltage from the voltage bus (block 410). The surplus power is supplied to components connected to the critical VRM(s) until the critical voltage event has subsided (block 412). The process ends at terminator block 414.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A computer chip comprising:
  a Voltage Regulation Module (VRM) array, wherein said VRM array is distributed in a three dimensional (3D) arrangement on said computer chip, wherein said VRM array comprises a first VRM and a second VRM;
  a power plane comprising a first power bus and a second power bus operatively connected by a voltage gate, wherein the first power bus is coupled to the first VRM, and the second power bus is coupled to the second VRM, wherein the first VRM provides a first fixed voltage to the first power bus, and the second VRM provides a second fixed voltage to the second power bus;
  a power island comprising a first circuit and a second circuit, wherein the first power bus is coupled to the first circuit and the second power bus is coupled to the second circuit; and
  a communication logic configured to:
    receive, via the first VRM, a first determined power need for the first circuit,
    receive, via the second VRM, a second determined power need for the second circuit,
    determine whether the first VRM has excess voltage based on the first determined power need and the first fixed voltage, and
    in response to a determination that the first VRM has excess voltage, automatically cause the first power bus to push excess voltage onto said power plane via the voltage gate.

2. The computer chip of claim 1, wherein each VRM in said VRM array may be independently preset to a specific voltage.

3. The computer chip of claim 1, wherein said first communication logic further comprises logic for issuing instructions to one or more noncritical VRMs in said VRM array that causes said one or more noncritical VRMs to send any excess voltage to one or more power buses within said power plane.

4. The computer chip of claim 1, wherein said second communication logic further comprises logic for issuing instructions to one or more critical VRMs in said VRM array that causes said one or more critical VRMs to utilize the excess voltage to power one or more coupled circuits.

5. The computer chip of claim 1, wherein the communication logic is further configured to:
determine whether the first VRM has a deficiency of voltage based on the first determined power need and the first fixed voltage, and
in response to a determination that the first VRM has a deficiency of voltage, cause the first power bus to pull excess voltage from said power plane via the voltage gate.

6. The computer chip of claim 1, wherein the communication logic is further configured to:
receive, via the second VRM, a second determined power need for the second circuit,
determine that the second VRM has a deficiency of voltage based on the second determined power need and the second fixed voltage,
wherein the determination whether the first VRM has excess voltage is made in response to a determination that the second VRM has a deficiency of voltage.

7. A data processing system comprising:
a memory;
a system bus coupled to the memory; and
a computer chip coupled to the system bus, wherein said computer chip comprises:
a Voltage Regulation Module (VRM) array, wherein said VRM array is distributed in a three dimensional (3D) arrangement on said computer chip, wherein said VRM array comprises a first VRM and a second VRM;
a power plane comprising a first power bus and a second power bus operatively connected by a voltage gate, wherein the first power bus is coupled to the first VRM, and the second power bus is coupled to the second VRM, wherein the first VRM provides a first fixed voltage to the first power bus, and the second VRM provides a second fixed voltage to the second power bus;
a power island comprising a first circuit and a second circuit, wherein the first power bus is coupled to the first circuit and the second power bus is coupled to the second circuit; and
a communication logic configured to:
receive, via the first VRM, a first determined power need for the first circuit,
receive, via the second VRM, a second determined power need for the second circuit,
determine whether the first VRM has excess voltage based on the first determined power need and the first fixed voltage, and
in response to a determination that the first VRM has excess voltage, automatically cause the first power bus to push excess voltage onto said power plane via the voltage gate.

8. The data processing system of claim 7, wherein each VRM in said VRM array may be independently preset to a specific voltage.

9. The data processing system of claim 7, wherein said first communication logic further comprises logic for issuing instructions to one or more noncritical VRMs in said VRM array that causes said one or more noncritical VRMs to send any excess voltage to one or more power buses within said power plane.

10. The data processing system of claim 7, wherein said second communication logic further comprises logic for issuing instructions to one or more critical VRMs in said VRM array that causes said one or more critical VRMs to utilize the excess voltage to power one or more coupled circuits.

11. The data processing system of claim 7, wherein the communication logic is further configured to:
determine whether the first VRM has a deficiency of voltage based on the first determined power need and the first fixed voltage, and
in response to a determination that the first VRM has a deficiency of voltage, cause the first power bus to pull excess voltage from said power plane via the voltage gate.

12. The data processing system of claim 7, wherein the communication logic is further configured to:
receive, via the second VRM, a second determined power need for the second circuit,
determine that the second VRM has a deficiency of voltage based on the second determined power need and the second fixed voltage,
wherein the determination whether the first VRM has excess voltage is made in response to a determination that the second VRM has a deficiency of voltage.

* * * * *